Jan. 21, 1969         B. M. GOLDSMITH ET AL         3,423,674
THEFT-DETECTION SYSTEM FOR LIBRARY USE INCLUDING
A PLURALITY OF HALL CELLS
Filed June 29, 1965                                  Sheet 1 of 2
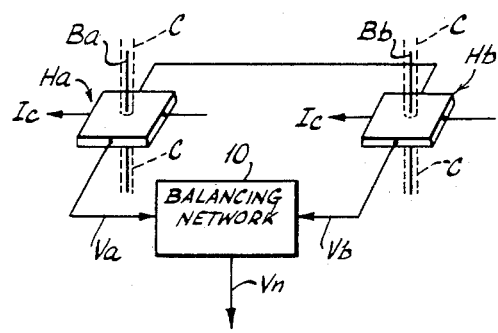
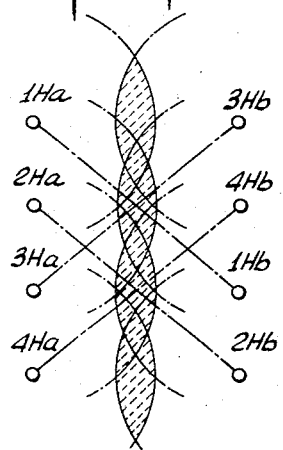
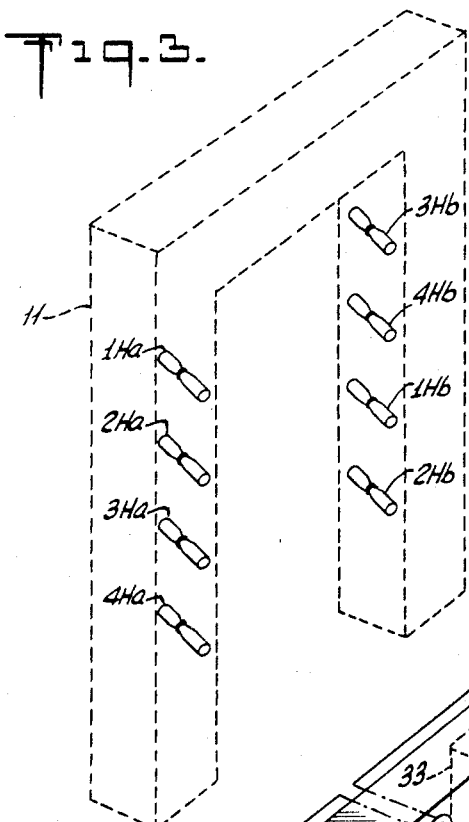
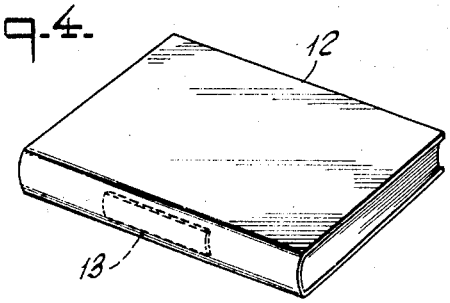
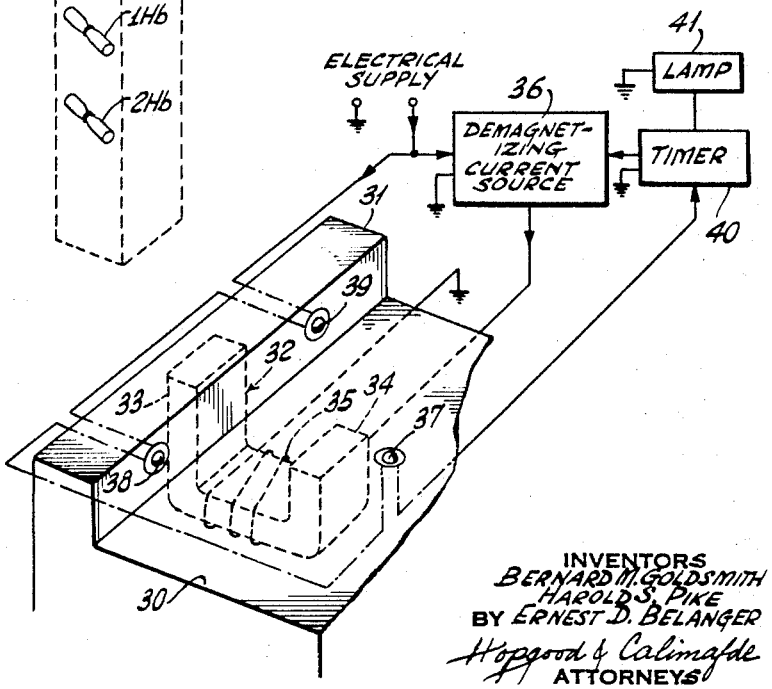
INVENTORS
BERNARD M. GOLDSMITH
HAROLD S. PIKE
BY ERNEST D. BELANGER
Hopgood & Calimafde
ATTORNEYS

United States Patent Office 3,423,674
Patented Jan. 21, 1969

3,423,674
THEFT-DETECTION SYSTEM FOR LIBRARY USE INCLUDING A PLURALITY OF HALL CELLS
Bernard M. Goldsmith, Little Silver, Harold S. Pike, Jr., Fanwood, and Ernest Donald Belanger, Bloonsbury, N.J., assignors to Nytronics, Inc., Phillipsburg, N.J., a corporation of New Jersey
Filed June 29, 1965, Ser. No. 467,916
U.S. Cl. 324—45    9 Claims
Int. Cl. G01r 33/06

ABSTRACT OF THE DISCLOSURE

This invention relates to a system for detecting thefts of library books and includes as a feature, the provision of a magnetic element in each book. The system for detecting the theft of such books includes the means for detecting the magnetic elements in such books. At least a pair of Hall cells are used adjacent to the exit having their outputs connected in circuit opposition to provide a limited sensing region. The scanning patterns of the cells may be criss-crossed to insure detection of the small magnetized element in any random position or orientation within a relatively large boundary region.

---

This invention relates to devices controlled by the sensing of magnetic means and, more particularly, to such devices using a Hall cell as the sensing agent.

It is well known that a Hall cell when in a magnetic field produces an output dependent on the strength of the field. The Hall cell may thus be used to sense changes in magnetic flux and has been employed as a flux sensing agent in various devices, for example, in a flux measurement device wherein the flux producing means is placed close to the cell. As another example, the cell may sense the passage of a magnet-bearing article on a conveyor and operate a device accordingly.

One problem of a flux-detection system is to confine its response to magnetic elements within a definite boundary region. The problem becomes more difficult when the flux producing element is very small in relation to the boundary region and still more difficult when the element may have any random position and orientation within the boundary region. To detect a small magnetic element within a relatively large boundary region, known systems would have to be made so sensitive that they would undesirably respond to larger magnetic flux producing means outside the boundary region.

The present invention provides a novel system capable of detecting magnetic elements small in relation to the region to be tested and unresponsive to larger flux producing articles outside the region to be tested.

A feature of the novel system resides in the provision of at least one pair of Hall cells having their outputs connected in circuit opposition. With this arrangement, on a random movement of the element near or between the two cells, there is always a position of the element in which it will cause one cell to produce a greater output than the other cell, with the difference effective to operate the detection system. On the other hand, a larger magnetic field generating object further away from the pair of cells will produce a magnetic flux of practically equal strength and polarity at the two cells and the net balance of their outputs will be zero or below the threshold value for operating the detection system.

The invention also contemplates the provision of a plurality of such pairs of Hall cells to more closely define the region to be scanned for a magnetized element and to provide a more uniform sensing pattern through the boundary region. Preferably, the scanning patterns of the cells will be criss-crossed to insure detection of a small magnetized element in any random position or orientation within a relatively large boundary region. Further, the plurality of pairs of cells may be arranged to explore a relatively wide area, two, three or more feet wide, for small magnetized objects.

One particular use of the novel system is to prevent unchanged books or reference material from being taken undetected out of a library. The detection system will include one or more pairs of opposed flux sensing cells built into the sides of the passage through which a borrower may leave the lending room. Books or other articles to be protected will each be equipped with a magnetizable element (such as a short length of 1/8-inch Alnico rod or a thin sheet of magnetizable plastic rubber, or other magnetic material) which will be electronically de-magnetized when the article is properly checked out and will be magnetized again when returned and before being re-shelved. If the article has not been properly charged out and hence not demagnetized, it will be sensed by the cells when carried into the exit passage and the detection system will be operated to alarm condition.

In another application of the novel system, a single pair of the opposed cells may be arranged very close to each other to detect minute magnetized materials between the cells. Stray magnetic fields produced by objects not between the cells will then have to be very large or close to the cells before they will interfere with the detection system.

Each Hall cell will preferably be provided with a pair of flux concentrators of a suitable type, such as the straight rod, the L type, or the vane type.

The invention also provides means for attempting demagnetization of the cell concentrators when the system is in alarm condition. If the magnetic element causing the alarm condition remains in the sensing range of the cells, the alarm condition will persist but on departure of the element from the sensing range, the cell demagnetization will be effective and the alarm condition will be discontinued.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 schematically shows a pair of the Hall cells having their outputs connected in circuit opposition;

FIG. 2 is a schematic representation of a zig-zag arrangement of four pairs of the Hall cells providing an overlapping scanning pattern;

FIG. 3 is a perspective diagrammatic view of a passage provided in its sides with four pairs of the Hall cells in a zig-zag arrangement which may be similar to that represented in FIG. 2;

FIG. 4 is a perspective view of a book equipped with a concealed magnetizable element;

FIG. 6 is a fragmentary diagram in perspective schematically indicating apparatus for the magnetized treatment of books or the like.

Figure 5:
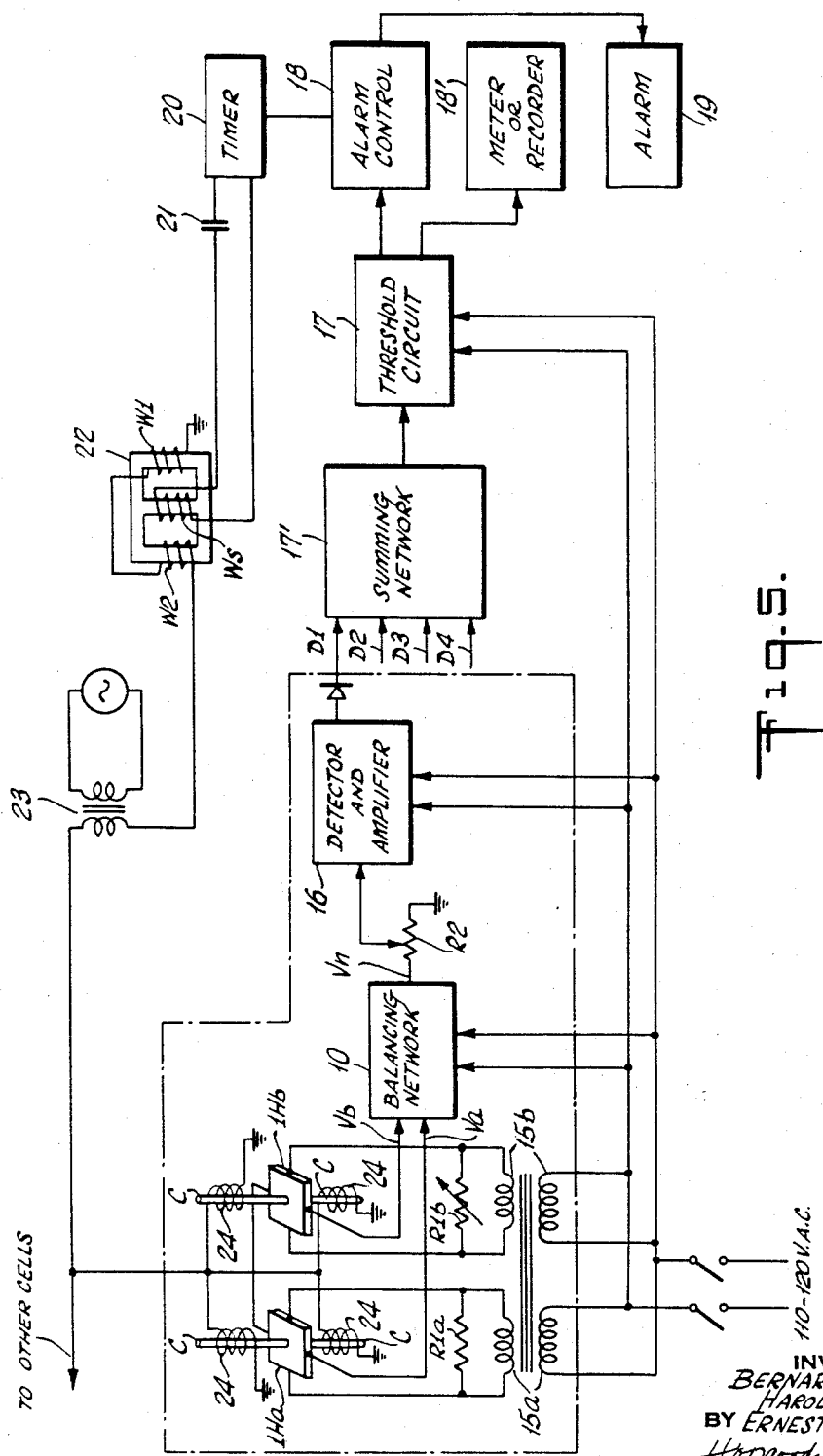
FIG. 5 is a schematic circuit and block diagram of the novel detection system in relation to a pair of the Hall cells.

The basic flux-sensing unit provided by the invention is indicated in FIG. 1. It comprises a pair of Hall cells $Ha$ and $Hb$ spaced apart a large distance compared to the magnetic object to be detected and having their outputs $Va$ and $Vb$ connected in opposition into a suitable balancing network 10, the output $Vn$ of which manifests the balance between the cell outputs. The exciting current for each cell is denoted by $Ic$ and may be A.C. or D.C.; the external flux on cell $Ha$ is denoted by $Ba$ and the external flux on cell H$b$ by B$b$. The output of each cell varies with the applied flux and is A.C. or D.C. output depending on whether the exciting current I$c$ is A.C. or D.C. If the magnetic fields B$a$ and B$b$ are identical,[1] the cell outputs V$a$ and V$b$ are equal and of the same polarity, and the net output V$a$–V$b$ into the balancing network 10 is zero. If the applied magnetic fields are unequal, the cell outputs will differ, and the input into the balancing network will be characterized by the predominant one of voltages V$a$, V$b$, being the difference between these voltages. With this arrangement, a magnetized element small relative to the spacing between the cells H$a$ and H$b$, will normally act with differential effect on the respective cells when moved at random near or between the cells. Consequently, the cell outputs V$a$ and V$b$ will differ and the balance output V$n$ will be effective to cause the detection system to manifest the presence of the magnetized element sensed by the cells. On the other hand, the lines of flux reaching the pair of cells from a large flux generating object at a distance from the cells will be substantially similar in intensity and direction at each cell; hence, the cell outputs will be virtually equal and the balance output V$n$ will approach zero and effect no response of the detection system. The two-cell sensing unit thus acts with desirable discrimination to sense small magnetic objects near or between the opposed cells while ignoring large magnetic flux-producing objects at a distance from the sensing unit large compared to the spacing between the cells.

The effectivity of the sensing unit may be improved by providing each cell with flux concentrators, denoted by C in FIG. 1. The flux concentrators may be of any suitable type, for example, straight rods, L type or vane type.

The opposed cells of a sensing unit may be put very close together, almost touching, to detect minute magnetic material near or between the cells. Stray magnetic fields emanating from larger objects would then have to be very large or very near the sensing unit before they would interfere with the detection system.

To define more precisely the bounds of a region to be explored for magnetic objects small compared to the region and to provide a closer and more uniform scanning pattern through the region, a plurality of the two-cell sensing units may be provided. Further, to guard against the remote possibility that a magnetic object may move through the boundary region in a constant position and orientation such that the net output of the sensing units will be zero, the axes of the respective sensing units will be disposed at different angles or criss-crossed. A combination of four such sensing units 1H$a$–1H$b$, 2H$a$–2H$b$, 3H$a$–3H$b$ and 4H$a$–4H$b$ is schematically shown in FIG. 2 wherein the circles represent the cells, the straight lines indicate the axes of the sensing units, the arcs represent one level of sensitivity around the cells, and the shaded areas denote increased sensitivity levels where the sensing fields of the cells overlap. It may be noted that the angles of the pair of cells, or their concentrators, of each sensing unit should be the same although the angles of the different pairs of cells can be different.

FIG. 3 represents a doorway 11 provided within its sides with an arrangement of two-cell sensing units to detect magnetic objects moving into the doorway. The arrangement of cells in FIG. 3 may be similar to that in FIG. 2 and composed of the cell pairs 1H$a$–1H$b$, 2H$a$–2H$b$, 3H$a$–3H$b$ and 4H$a$–4H$b$. The doorway may be that of a library, and the sensing units built into the sides of the doorway may guard against the unauthorized removal of books or other reference material by persons leaving through the doorway. Books or other articles to be protected will each be equipped with a magnetizable element (such as an Alnico rod or a thin sheet of magnetizable rubber or plastic, or other magnetizable material) which will be electronically de-magnetized, in known manner, when the article is properly checked out. When the article is returned, it will be re-magnetized before being put back on the shelf. As an example, FIG. 4 shows a book 12 having a magnetizable element 13 concealed in the binding. Should the book be carried into the doorway 11 while the element 13 is magnetized, the sensing means guarding the doorway will react and cause the detection system to operate an alerting signal means.

The novel detection system is diagrammatically shown in FIG. 5 which includes the circuit of only one sensing unit, the one comprising the cells 1H$a$ and 1H$b$ being chosen. Power for the detection system may be taken from a common 110–120 volt, 60 cycle line. Closing the switch S applies power from the line to a pair of similar transformers 15$a$ and 15$b$ for separately but equally exciting the cells 1H$a$ and 1H$b$ with alternating current. The secondaries of the transformers are shunted by protective, current-regulation resistors R1$a$ and R1$b$. The outputs V$a$ and V$b$ of the cells will be alternating voltage outputs and will vary according to the applied magnetic fields concentrated by the cell concentrators C. The cell outputs are connected in opposition into balancing network 10 which may be of any known type for producing a steady voltage to oppose the output of the Hall cells caused by extraneous stationary fields, such as a chair or other large metal object non-symmetrically positioned with respect to the cells; such balancing voltage will be understood also to compensate for differences in stray-flux pick due to misalignment of the Hall cells of a given pair, manufacturing variations from cell to cell, etc. The net output voltage V$n$ of the balancing network appears across a resistor R, and a measure of this output voltage (for gain control purposes) is applied by a tap to a detector-amplifier unit 16; this voltage V$n$ will thus be seen to truly reflect the transient flux (i.e., independent of stray flux) detected by the cells of a given pair. This unit may be of any suitable, known type for producing an amplified D.C. output proportional to the input voltage. Rectifier means, symbolized at K, is shown in the output D1 of the unit 16 to indicate that it is a D.C. output. The output from unit 16 is applied to a threshold circuit 17 of any suitable type which is actuated or tripped when the input voltage is above a threshold or critical value; actually, if more than one pair of cells (with attendant amplifiers and detectors) is used, then the connection of all rectified detector outputs to the threshold circuit will be understood to be by way of a summing network, designated 17′. Assuming the input voltage to unit 17 is above the critical value, the unit actuates an alarm control 18 which may comprise electromagnet relay means or equivalent electronic relay means. Under the control of the unit 18, an alarm 19 will be actuated. Instead of an audible alarm, any other alerting signal may be produced. If a quantitative or continuous measure of the magnetic flux sensed by the system is desired, then a meter or recorder 18′ may be operated by the output of summing network 17′.

To test for continued presence of a magnetic object in the region sensed by a pair of opposed cells (as distinguished from the flux generated by residual magnetism in the concentrators), the invention provides means for intermittently clearing the residual magnetic flux from the concentrators. For this purpose, the control unit 18 of the detection device, when actuated, operates an electronic timer 20 to charge and re-charge a condenser at short intervals, such as in the order of 5 seconds. The condenser discharge current is applied to the central, saturating winding W$s$ of a saturable reactor 22. The outer windings W1 and W2 are in series connection with one end of the secondary of a transformer 23 which is powered from an A.C. source; this source may be the 110–120 volt, A.C. supply line. The other end of the secondary of the ---
[1] For simplicity in the present discussion, these external fluxes are assumed to be D.C. in nature.

transformer 23 connects in multiple to respective demagnetizing coils 24 around the concentrators C of the several Hall cells. The discharge from the condenser 21 reduces the reactance of the outer windings W1 and W2 of the reactor 22 so that current will flow in the coils 24. As the condenser discharge decays, the reactance of windings W1 and W2 rises until, with the condenser fully discharged, the demagnetizing current is zero. This cycle repeats until the control circuit 18 returns to unoperated condition. The cells and their concentrators are thus intermittently cleared of residual magnetic flux until the object producing the flux is removed from the sensing region. When the object has been removed, the cells and their concentrators are clear of residual magnetic flux and ready to sense a next magnetic object.

The set of parts shown in FIG. 5 within the dotted lines is individual to a single pair of opposing cells. A similar set of parts is provided for each pair of opposed cells. Thus for a sensing arrangement of four pairs of cells, there will be four such sets of parts. The elements of the detection device outside the dotted lines in FIG. 5 are common to the several sensing units. The outputs D2, D3 and D4 of the units 16 associated with the three other sensing units in an arrangement of four sensing units are directed to the common threshold circuit 17 by way of the summing network 17', so that the latter circuit will operate if any one of the outputs D1, D2, D3 and D4 is above critical value or if the addition of any permutation of the outputs D1 to D4 is above the critical value.

In use, the library book 12, as stored in library shelves, will have been magnetized at 13, so that illegal departure of the book 12 through the passage 11 will be detected by the described equipment. On the other hand, legal book borrowing will require clerical check-out at the desk clerk, whose desk is symbolized in FIG. 6. The desk comprises a table surface 30 with a back stop or ledge 31 of height adequate to accommodate the thickness of any book to be checked out. Concealed beneath the central region of the ledge 31 is a magnetic core 32 of generally U- or J-shape, defining spaced legs 32–34. Leg 33 is preferably longer than leg 34 substantially to the extent of the height of ledge 31, so that the span from the pole at 33 across the air gap to the pole at 34 will necessarily embrace the magnetized material 13 of book 12. A demagnetizing coil 35 is shown linked to core 32 and connected to a suitable demagnetizing means 36. Preferably, the pole faces at 33–34 are located as close as possible behind the exterior surfaces (of table 30 and ledge 31) by which they are concealed.

FIG. 6 additionally shows plural probes or limit switches 37–38–39, in the exposed adjacent surfaces of ledge 31 and table 30, and so positioned with respect to poles 33–34 that all three switches 37–38–39 must be actuated in order to supply demagnetizing current to coil 35; switches 38–39 straddle pole 33, and switch 37 is in the central vertical plane of poles 33–34. Thus, when properly placed, a book 12 will lie flat on table 30 to close switch 37, and its bound edge (with magnetizable material 13) will be pressed against ledge 31 to close switches 38–39.

In accordance with a feature of the invention, switches 37–38–39 are series-connected to a timer 40 for determining a predetermined interval of supply of a decaying demagnetizing current to coil 35. An indicator lamp 41, preferably visible only to the desk clerk, will indicate to her the relatively short time-out of the demagnetizing interval, the demagnetizing operation being signalled to her as completed when the light is extinguished.

It will be understood that the showing of FIG. 6 and its discussion is illustrative also of the clerical operation of returning a book which has been borrowed. In that situation the problem is one of charging the magnetizable material 13, and this can be done with precisely the same equipment as long as the source 36 is constituted for the supply of charging current (a short pulse) to coil 35.

While we have described the invention in detail for the preferred form shown, it will be understood that modifications may be made without departing from the scope of the invention as defined in the claims which follow.

We claim:

1. A detection system for magnetic flux generating objects, the system comprising a pair of Hall cells spaced apart a large distance compared to the magnetic flux generating objects to be detected and defining a sensing zone, means to excite the cells with current to condition the cells for producing output voltages varying with the intensity and orientation of magnetic flux reaching them from such object near or between the cells, and means responsive to the difference in output voltages of the two cells, each cell being provided with flux concentrating means, demagnetizing coil means associated with the flux concentrating means, a control unit operated in response to effective resultant output voltage of the sensing unit, and means conditioned by the control unit to effect current flow in the demagnetizing coil means.

2. A detection system as in claim 1, the last-named means including cyclically repetitive means to attempt demagnetization of the flux concentrating means by the demagnetizing current as long as said control unit remains operated by continued presence of the magnetic flux generating object in the sensing ambit of the two-cell sensing unit, the cell-demagnetizing means clearing the cells of residual magnetic flux upon removal of the object from within the sensing region.

3. A magnetic flux detection system for detecting the passage of a magnetized article through a doorway or the like opening, comprising first and second pairs of spaced Hall cells, one cell of each pair being mounted on one side of said opening and the other cell of each pair being mounted at the other side of the opening, means to effect current excitation of each cell to condition it for producing an output voltage varying with the intensity and orientation of the magnetic flux reaching the cell, first means connecting the cells of the first pair in circuit opposition, and second means connecting the cells of the second pair in circuit opposition, whereby an output voltage reflecting the differential response of said first and second pairs of cells is achieved for each of said pairs.

4. The system of claim 3, and including a summing network connected to the outputs of said respective pairs and summing said outputs.

5. The system according to claim 4, and including alarm means including a threshold circuit responsive to summed signals exceeding a predetermined threshold level.

6. A system according to claim 4, and including meter means connected to the output of said summing network for continuously monitoring the cell output.

7. A magnetic flux detection system for detecting the passage of a magnetized article through a doorway or the like opening, comprising plural pairs of spaced Hall cells, one cell of each pair being mounted at one side of said opening and the other cell of each pair being mounted at the opposite side of said opening, means to effect current excitation to each cell to condition it for producing an output voltage varying with the intensity and orientation of magnetic flux reaching the cell, each pair of cells being connected in output circuit opposition so that the resultant output voltage for the performance of the cells of each pair is a function of the difference in output voltages of the cells of that pair.

8. The system according to claim 7, in which the geometrical alignment of the cells of one pair crosses the geometrical alignment of the cells of another pair in the region between the sides of said opening.

9. A detection system for magnetic flux generating objects in library books, the system comprising a pair of Hall cells spaced apart a large distance compared to the magnetic flux generating objects to be detected and defining a sensing zone, means to excite the cells with current to condition the cells for producing output voltages varying with the intensity and orientation of magnetic flux reaching them from such object near or between the cells, and means responsive to the difference in output voltages of the two cells, each cell being provided with flux concentrating means, demagnetizing coil means associated with the flux concentrating means, a control unit operated in response to effective resultant output voltage of the sensing unit, and means conditioned by the control unit to effect current flow in the demagnetizing coil means, means for the controlled magnetization of a book or the like to be checked against unauthorized removal, comprising two supporting surfaces in generally rightangular adjacent relation and adapted on one of said surfaces to receive a book cover and on the other said surfaces to receive a book binding, a core of magnetic material comprising the flux generating object including opposed pole faces respectively adjacent corresponding localized parts of each of said surfaces and defining between said pole faces an air gap into which a part of the book binding is to be received, and magnetizing control means comprising a source of electric current and a coil linked to said core, including switch means positioned in one of said surfaces for actuation upon placement of a book or the like in proper position adjacent said surfaces, said switch means being connected in control relation with said source connection to said coil.

References Cited

UNITED STATES PATENTS

| | | | |
|---|---|---|---|
| 3,248,645 | 4/1966 | Gilbert | 324—45 |
| 3,292,080 | 12/1966 | Trikilis | 324—41 |
| 2,820,632 | 1/1958 | Fowler | 317—157.5 X |
| 3,237,056 | 2/1966 | Du Puy | 317—157.5 X |
| 3,303,398 | 2/1967 | Barta et al. | 317—157.5 |

OTHER REFERENCES

RFL News: "Model 2000, Differential Gaussmeter," vol. VII, No. 3, February 1961.

FW Bell Inc.: "Differential Probes."

RUDOLPH V. ROLINEC, *Primary Examiner.*

P. A. URIBE, *Assistant Examiner.*